(12) United States Patent
Wang et al.

(10) Patent No.: US 7,813,554 B2
(45) Date of Patent: Oct. 12, 2010

(54) METHOD AND APPARATUS OF EXTRACTING TEXT FROM DOCUMENT IMAGE WITH COMPLEX BACKGROUND, COMPUTER PROGRAM AND STORAGE MEDIUM THEREOF

(75) Inventors: Yanquing Wang, Beijing (CN); Yaping You, Beijing (CN); Shangfeng Du, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 11/607,971

(22) Filed: Dec. 4, 2006

(65) Prior Publication Data

US 2007/0160295 A1    Jul. 12, 2007

(30) Foreign Application Priority Data

Dec. 29, 2005    (CN) ........................ 2005 1 0135744

(51) Int. Cl.
*G06K 9/48* (2006.01)
(52) U.S. Cl. .................. 382/199; 382/237; 382/167
(58) Field of Classification Search ................. 382/199, 382/237
See application file for complete search history.

(56) References Cited

U.S. PATENT DOCUMENTS 7,024,043 B1 * 4/2006 Fujimoto et al. ............ 382/237
7,437,002 B2 * 10/2008 Tanaka ........................ 382/199

FOREIGN PATENT DOCUMENTS

JP    2000020714    1/2000

* cited by examiner

*Primary Examiner*—Samir A. Ahmed
*Assistant Examiner*—Ruiping Li
(74) *Attorney, Agent, or Firm*—Fitzpatrick, Cella, Harper & Scinto (57) ABSTRACT

The present invention discloses an apparatus of extracting text from document image with complex background, a method of extracting text from document image with complex background, computer program and storage medium thereof. The preferred method of extracting text from document image with complex background according to the present invention comprising the steps of: a first edge extracting step of extracting edges which have higher contrast than a first contrast threshold from said image; a searching step of searching connected edges from said extracted edges; a second edge extracting step of extracting edges which have higher contrast than a second contrast threshold in case that the pixels number of said searched connected edges is bigger than a predetermined size, wherein said second contrast threshold is higher than said first contrast threshold.

16 Claims, 9 Drawing Sheets

Original image → Extracted text image

FIG. 6

Original image → Extracted text image

METHOD AND APPARATUS OF EXTRACTING TEXT FROM DOCUMENT IMAGE WITH COMPLEX BACKGROUND, COMPUTER PROGRAM AND STORAGE MEDIUM THEREOF

FIELD OF THE INVENTION

The present invention generally relates to image processing. In particular, the present invention relates to an apparatus of extracting text from document image with complex background, a method of extracting text from document image with complex background, computer program and storage medium thereof.

BACKGROUND OF THE INVENTION

Text extraction is a very important step for many applications, such as Optical Character Recognition (OCR), text-based video retrieval, document image compression, etc. Most of current techniques aim to extract text from images with simple background. In recent years, the technique of extracting text from complex images is required in more and more fields, such as complex document analysis, engineer drawings analysis, etc. However, it is a very difficult problem to extract text from document image with complex background. Many methods have been proposed by prior researchers, most of them are only effective for simple or not so complex images.

Current text extraction methods can be classified into two groups: Color-clustering based methods and edge-analysis based methods.

Color-clustering based methods assume that text has homogeneous foreground colors. However, this is not always the case, especially for small characters. For example, text characters may be printed with different colors; images may be captured under uneven illumination conditions. And for small texts, the foreground colors are always not uniform, because the transition region is too wide in comparison with stroke width. Accordingly, it is hard to acquire proper global binarizing threshold for the whole image and thus it is impossible to eliminate all the light-colored background with un-uniform colors.

On the other hand, the edge-analysis based methods assume that text has big contrast with background. But in images with complex background, non-text objects maybe have big contrast with background, which will cause the text edges and non-text edges touch with each other after edge detection processing. This often brings difficulty or unstable results for edge analysis.

For example, the Japanese Patent Application Laid-open No. JP-A-2000-20714 has disclosed an image processing method, its device and recording medium storing image processing function.

Figure 10:
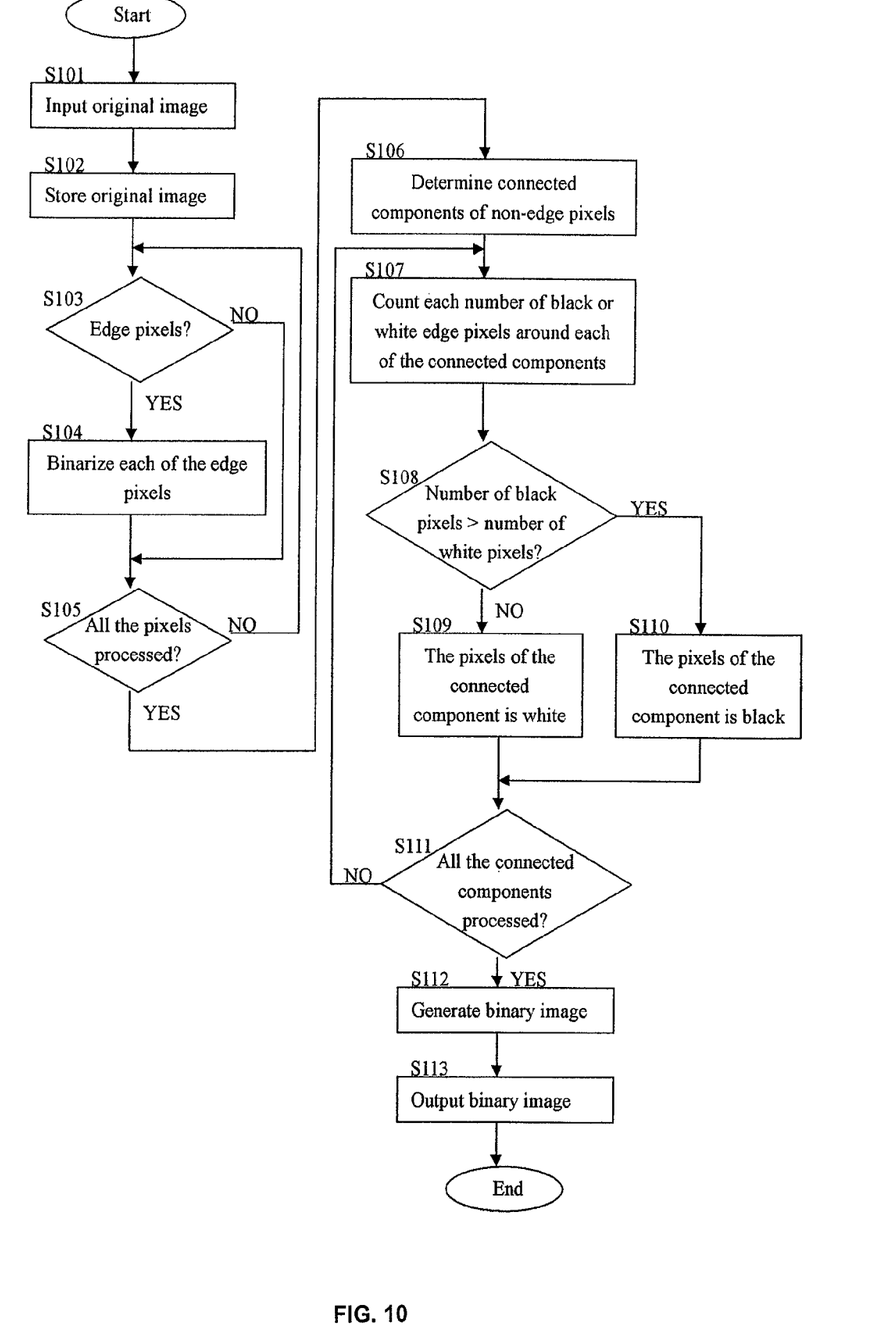
FIG. 10 is a flow chart showing the image processing method according to the prior art.

FIG. 10 shows the flow chart of the image processing method disclosed by the above Japanese Patent Application Laid-open No. JP-A-2000-20714.

To obtain a binary image having no noise interrupting recognition even on a background image, the density image of an original image to be threshold processed is inputted in step S101 and stored in step S102. Then, in step S103, a certain pixel is noticed and whether the pixel is the edge of a character or a ruled line or not is judged. Thereafter, in step S104, The pixel value on a binary image of the pixel judged as the edge is determined and stored. These operations are repeated for all pixels on the original image in step S105 and all connection components of pixels other than edges are found out in step S106. Then, in step S107, pixels brought into contact with the periphery of a certain connection component and having already determined pixel values are noticed and the numbers of black pixels and white pixels are respectively counted. The numbers of black and white pixels are mutually compared in step S108, and when the number of black pixels is larger, the whole connection component is registered as black pixels in step S110. In the other case, the whole connection component is registered as white pixels in step S109. The operation is repeated for all connection components in step S111, and finally a binary image is generated in step S112 and outputted in step S113.

According to the above described method, the long lines formed by the Connected Components appearing in the background can be recognized and removed from the binarized edge map. However, in the edge map after binarizing, closed text row also may form a long Connected Component. In this case, it is not easy to separate the text from the closed text row and the whole closed text row may be deemed as background and be ignored according to the above disclosed method. Whereas the text row is what is desired and should not be simply removed. Therefore, if the scanned document image with complex background is binarized and processed according to the above mentioned prior art, useful text may be lost.

SUMMARY OF THE INVENTION

Accordingly, the object of the present invention is to provide an apparatus of extracting text from document image with complex background, a method of extracting text from document image with complex background, computer program and storage medium thereof, so as to overcome the above mentioned defects in the prior art.

To achieve the above stated objects, according to an aspect of the present invention, there is provided a method of extracting text from document image with complex background comprising the steps of: a first edge extracting step of extracting edges which have higher contrast than a first contrast threshold from said image; a searching step of searching connected edges from said extracted edges; a second edge extracting step of extracting edges which have higher contrast than a second contrast threshold in case that the pixels number of said searched connected edges is bigger than a predetermined size, wherein said second contrast threshold is higher than said first contrast threshold.

To achieve the above stated objects, according to an aspect of the present invention, there is provided another method of extracting text from document image with complex background comprising the steps of: an adjusting step of adjusting the contrast threshold; a text area determining step of determining where is the text area based on said adjusted contrast threshold; wherein said adjusting step comprises a step of target area determining step of extracting the edges which have higher contrast than said contrast threshold from the target area, searching the connected edges from said extracted edges, and determining whether the area covering said searched connected edges should be a new target area; wherein said adjusting step enlarges said contrast threshold when said determined new target area is bigger than a predetermined size, and finishes adjustment of said contrast threshold when said determined new target area is smaller than or equal to the predetermined size; and wherein the text area determining step determines that the target area corresponding to said contrast threshold whose adjustment is finished should be the text area.

To achieve the above stated objects, according to another aspect of the present invention, there is provided an apparatus of extracting text from document image with complex background comprising: a first edge extracting means for extracting edges which have higher contrast than a first contrast threshold from said image; a searching means for searching connected edges from said extracted edges; a second edge extracting means for extracting edges which have higher contrast than a second contrast threshold in case that the pixels number of said searched connected edges is bigger than a predetermined size, wherein said second contrast threshold is higher than said first contrast threshold.

To achieve the above stated objects, according to another aspect of the present invention, there is provided another apparatus of extracting text from document image with complex background comprising: an adjusting means for adjusting the contrast threshold; a text area determining means for determining where is the text area based on said adjusted contrast threshold; wherein said adjusting means comprises a target area determining means for extracting the edges which have higher contrast than said contrast threshold from the target area, searching the connected edges from said extracted edges, and determining whether the area covering said searched connected edges should be a new target area; wherein said adjusting means enlarges said contrast threshold when said determined new target area is bigger than a predetermined size, and finishes adjustment of said contrast threshold when said determined new target area is smaller than or equal to the predetermined size; and wherein the text area determining means determines that the target area corresponding to said contrast threshold whose adjustment is finished should be the text area.

To achieve the above stated objects, according to still another aspect of the present invention, there is provided an apparatus of extracting text from document image with complex background comprising: an edge map calculation unit for calculating the edge map of the document image; a long background connected edges remove unit for classifying the edges in the edge map calculated by the edge map calculation unit into two types of "positive edge" and "negative edge", searching the connected edges formed by edges of the same type, and removing the connected edges formed by edges of the same type longer than a predetermined threshold; an edge map recalculation unit for searching connected edges formed by edges of both types in the edge map with the long connected edges formed by edges of the same types being removed by the long background connected edges remove unit, and recalculating local edge map for the bounding box of a connected edge formed by edges of both types larger than a second predetermined threshold; a text map mark unit for classifying the connected edges into three types of "normal-text", "reverse-text" and "background" and generating a mark map, wherein the foreground pixels of "normal-text" connected edges are marked as "normal-text", the foreground pixels of "reverse-text" connected edges are marked as "reverse-text", and the rest pixels are marked as "background"; and a text connected edge search and merge unit for searching on the mark map generated by the text map mark unit the connected edges formed by pixels with the same mark and forming the connected edges into text rows.

Computer program for implementing the above said method of extracting text from document image with complex background is also provided.

In addition, computer program products in at least one computer-readable medium comprising the program codes for implementing the above said method of extracting text from document image with complex background are also provided.

Other objects, features and advantages of the present invention will be apparent from the following description when taken in conjunction with the accompanying drawings, in which like reference characters designate the same or similar parts throughout the drawings thereof.

BRIEF DESCRIPTION OF THE DRAWINGS

The accompanying drawings, which are incorporated in and constitute a part of the specification, illustrate embodiments of the invention and, together with the description, serve to explain the principles of the invention. In the drawings.

DETAILED DESCRIPTION OF THE PREFERRED EMBODIMENT

In the following detailed description, numerous specific details are set forth in order to provide a thorough understanding of the invention. However, it will be appreciated by one of ordinary skill in the art that the present invention shall not be limited to these specific details.

Example of Computer System

The method of the invention may be implemented in any image processing device, for example, a personal computer (PC), a notebook, or a single-chip microcomputer (SCM) embedded in a camera, a video camera, a scanner, and etc. To a person skilled in the art, it would be easy to realize the method of the invention through software, hardware and/or firmware. It should be particularly noted that, to implement any step of the method or any combination of the steps, or any combination of the components, it is obvious for a person skilled in the art that it may be necessary to use I/O device, memory device, microprocessor such as CPU, and the like. The following descriptions and the method of the present invention will not necessarily mention such devices, although they are actually used.

Figure 1:
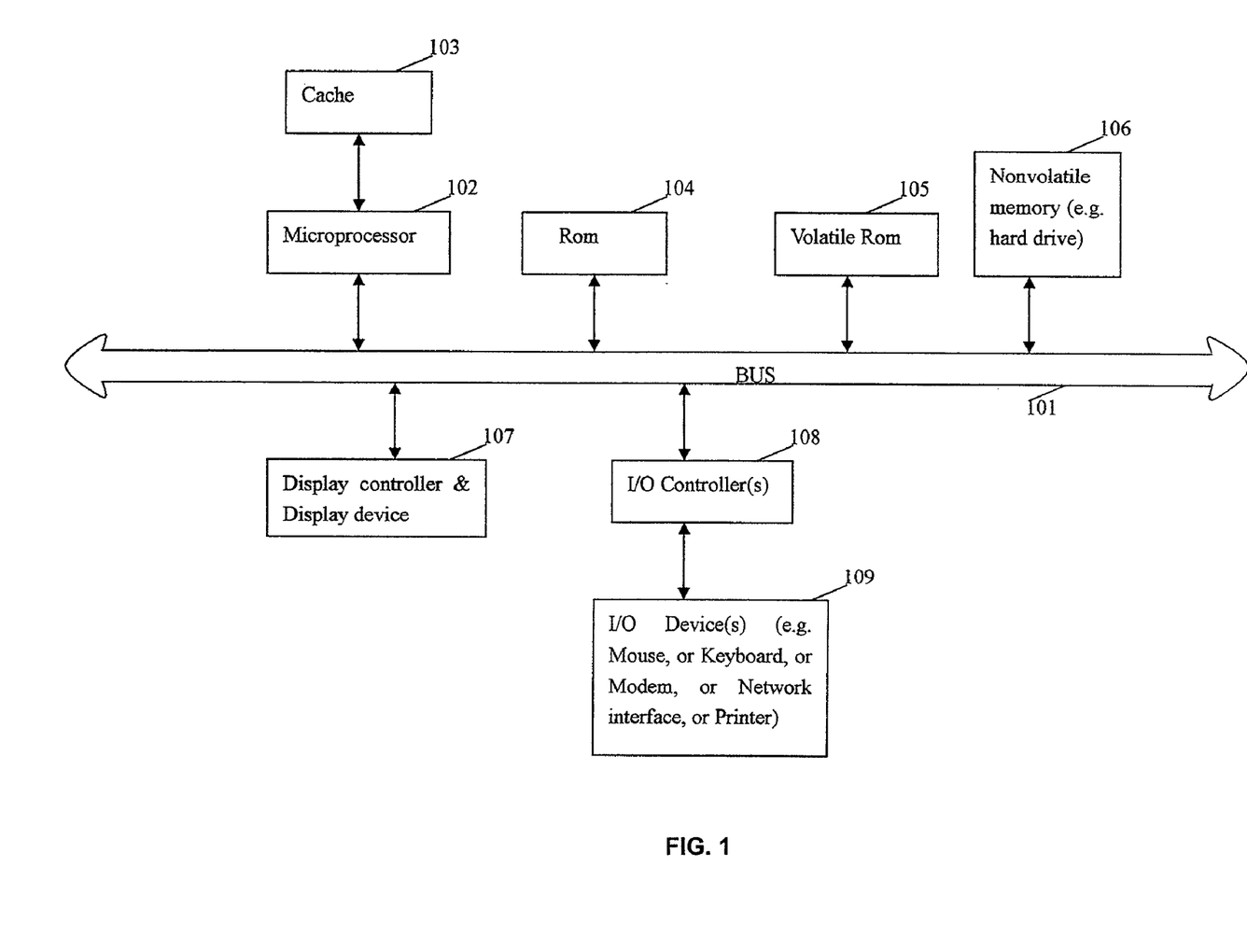
FIG. 1 is a block diagram of a computer system, which may be used with the present invention.

As the image processing device mentioned above, the block diagram illustrated in FIG. 1 shows one example of a typical computer system, which may be used with the present invention. Note that while FIG. 1 illustrates various components of a computer system, it is not intended to represent any particular architecture or manner of interconnecting the components, as such details are not germane to the present invention. It will also be appreciated that network computers and other data processing systems, which have fewer components or perhaps more components, may also be used with the present invention.

As shown in FIG. 1, the computer system, which is a form of a data processing system, includes a bus 101 that is coupled to a microprocessor 102 and a ROM 104 and volatile RAM 105 and a non-volatile memory 106. The microprocessor 102, which may be a Pentium microprocessor from Intel Corporation, is coupled to cache memory 103 as shown in the example of FIG. 1. The bus 101 interconnects these various components together, and also interconnects these components 103, 104, 105, and 106 to a display controller and display device 107 and to peripheral devices such as input/output (I/O) devices, which may be mouse, keyboards, modems, network interfaces, printers, and other devices that are well known in the art. Typically, the input/output devices 109 are coupled to the system through input/output controllers 108. The volatile RAM 105 is typically implemented as dynamic RAM (DRAM), which requires power continuously in order to refresh or maintain the data in the memory. The non-volatile memory 106 is typically a magnetic hard drive or a magnetic optical drive or an optical drive or a DVD RAM or other type of memory system, which maintains data even after power is removed from the system. Typically, the non-volatile memory will also be a random access memory, although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 101 may include one or more buses connected to each other through various bridges, controllers, and/or adapters, as is well known in the art. In one embodiment, the I/O controller 108 includes a USB (Universal Serial Bus) adapter for controlling USB peripherals.

Text Extraction Method and Apparatus from Document Image with Complex Background In the method and apparatus of extracting text from document image with complex background according to the present invention, the edge information is used to extract text and in order to overcome the disturbances of the background edges, it takes the following novel operations: 1) removing long Connected Component formed by background objects or very close texts (named long background edge Connected Components) in edge map based on edge classification; 2) recalculating edge map with feedback of an edge Connected Component size; 3) marking text map based on edge Connected Component classification.

Here, the Connected Component is the area covering the connected area, and the edge classification means to classify the edge pixels into positive edge or negative edge, which will be detailed described in the following description. The edge map is image which only includes edge pixels of object, and feed of an edge Connected Component size means the size of an edge Connected Component can be looked as a kind of feedback, with which the edge map can be determined whether to be recalculated or not.

The method of extracting text from document image with complex background according to the present invention is comprised generally of the steps of: (1) calculating edge map; (2) classifying edge into two types of "positive edge" and "negative edge" and searching Connected Component (CC) formed by edges of the same type, if a Connected Component formed by edges of the same type is long enough, removing its edges; (3) searching Connected Components formed by edges of both types (named edge Connected Component), if the size of a Connected Component formed by edges of both types is too large, recalculating edge map in its bounding box and searching Connected Components again; (4) classifying Connected Components into three types of "normal-text", "reverse-text" and "background", and generating a mark map, wherein the foreground pixels of "normal-text" Connected Components are marked as "normal-text", the foreground pixels of "reverse-text" Connected Components are marked as "reverse-text", and the rest pixels are marked as "background"; (5) on the mark map, searching Connected Components formed by pixels with the same mark (named text Connected Component), and forming the Connected Components into text rows.

Figure 2:
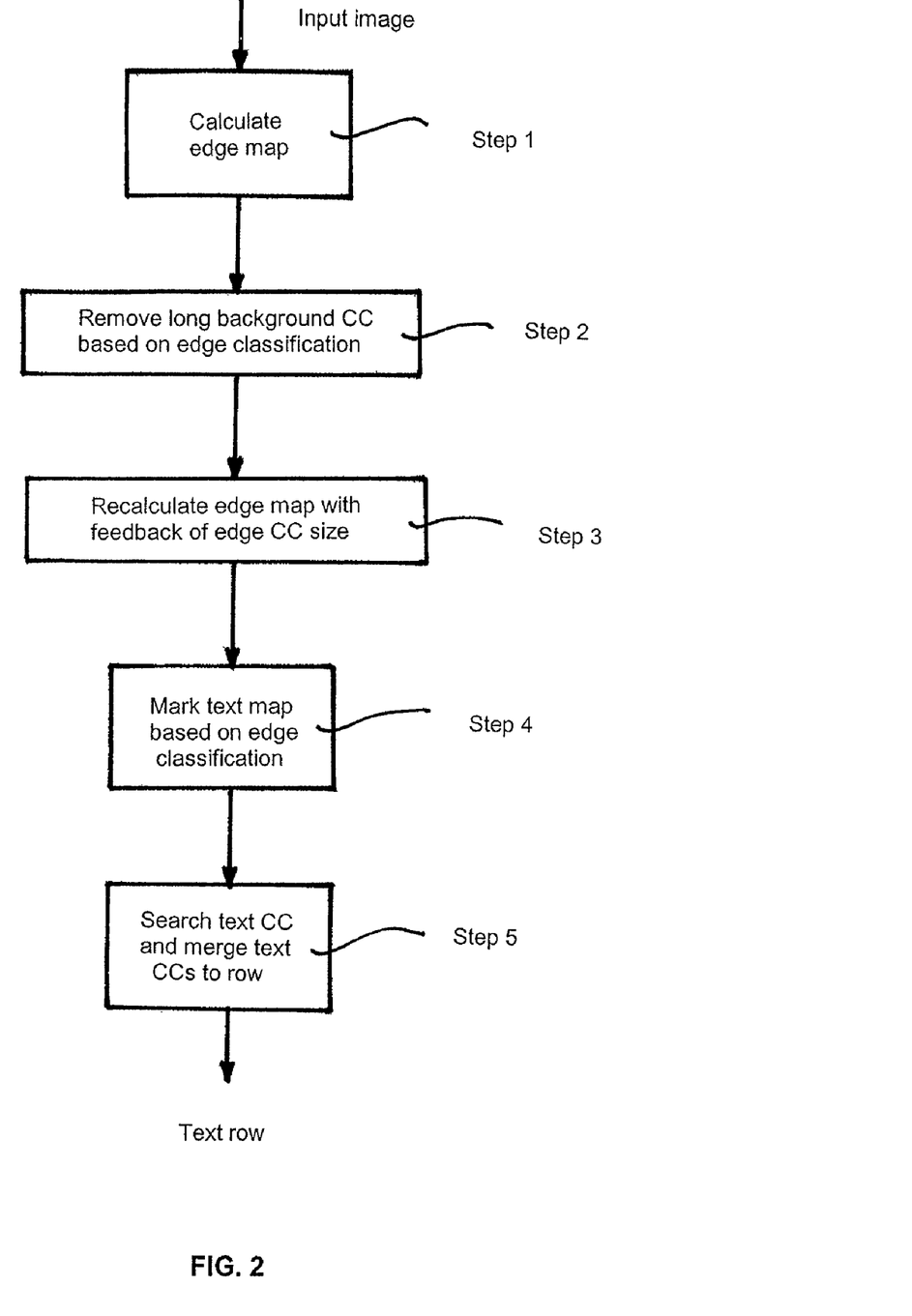
FIG. 2 is a flow chart showing the method of extracting text from document image with complex background according to the present invention.

In the following, the embodiments of the method of extracting text from document image with complex background and the apparatus of extracting text from document image with complex background according to the present invention will be explained by referring to the accompanying drawings. FIG. 2 is a flow chart showing the method of extracting text from document image with complex background according to the present invention.

As shown in FIG. 2, after inputting the image, in step 1, an edge map is calculated by performing Sobel operator on the original image, and then the gradient image is binarized.

Then, in step 2, the long background edge Connected Components based on edge classification is removed.

In this step, Connected Component analysis is performed on the edge map. For the edge map calculated from an image with complex background, there are two kinds of Connected Components that will greatly disturb the Connected Component analysis processing, i.e. Connected Components formed by edges of long lines and touched Connected Components formed by text edges which are very close to each other.

The above two kinds of Connected Components may appear in the neighborhood of Connected Components formed by text edges, or even touch with Connected Components formed by text edges, which will disturb the Connected Component analysis. Therefore, it is desired to find a way to remove them before the Connected Component analysis. For this purpose, an edge classification method is used in the present invention.

According to the method of the present invention, the edges are classified into negative edges and positive edges according to their gradient direction. Suppose $P_o$ is the gray level of the current edge pixel, $p_{neighbor}$ is the gray level of its 8-neighbors. The type of the current edge pixel is determined by the following formula:

$$\text{Edge type} = \begin{cases} \text{negative edge,} & \text{if } |P_o - \max(P_{neighbor})| < \\ & |P_o - \min(P_{neighbor})| \\ \text{positive edge,} & \text{else} \end{cases} \quad (1)$$

Figure 3:
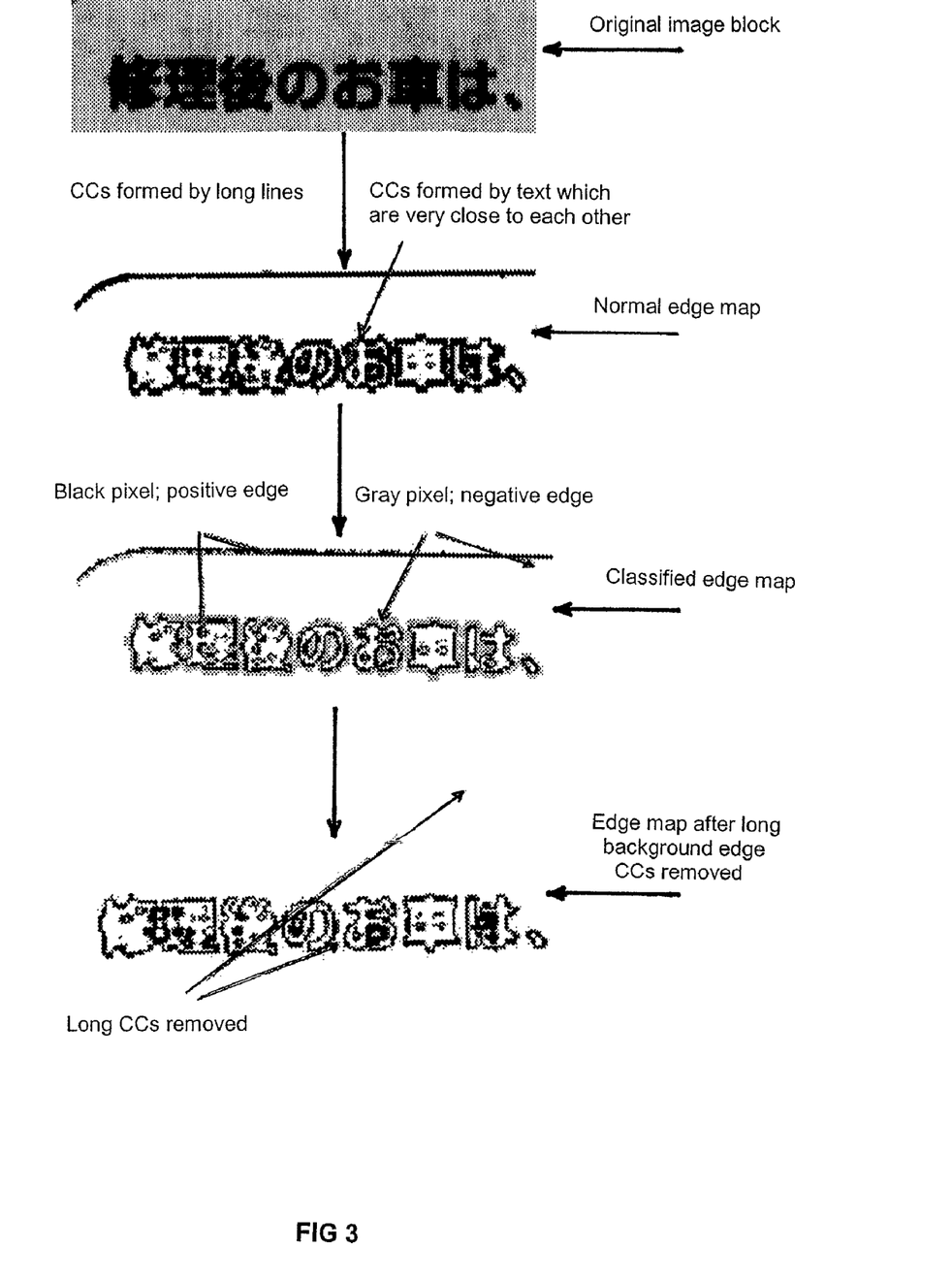
FIG. 3 shows an example for edge classification and results of removing long background edge Connected Components.

After the edge classification, the negative edge Connected Components and the positive edge Connected Components will be searched independently. If any of those Connected Components is longer than a predetermined threshold, such as 100, it is deemed as a background Connected Component, and it is removed from the edge map. After this operation, edges belong to long lines are removed. Touching edge of close texts are also removed, thus the rest edges are separated. FIG. 3 shows an example for edge classification and results of removing long background edge Connected Components.

It can be seen from the results shown in FIG. 3 that the disturbances of not only the long line but also the close texts can be removed according to the method of the present invention.

Removing edge Connected Component of long line is easily realized, and there are many kinds of method, such as disclosed in the above Japanese Patent Application Laid-open No. JP-A-2000-20714. However, in the edge map, close text row also may form a long Connected Component. Text row is what desired aims, which should not be simply removed. After classification, in text neighborhood there are two kinds edge Connected Component. One is outer edge Connected Component, and the other is inner edge Connected Component, as shown in FIG. 3. It can be seen that the outer edge Connected Component is long, but inner edge Connected Component is comparatively shorter. If the outer long one is removed from the edge map, the rest of inner edge Connected Component also can form text contour, which can be also used to further edge analysis.

After the long Connected Component formed by background objects and very close texts is removed from the edge map based on the edge classification, as described in the above step 2, the edge map will be recalculated with the feedback of Connected Component size in step 3.

After long background edge Connected Components were removed, the Connected Components formed by edges of both types are searched again (Herein, it does not need to distinguish "negative" and "positive").

Since the edge-based text extraction method is supposed to be applied on texts with size smaller than 60 pixels, the Connected Components that are larger than 60 pixels can be thrown away (Connected Component size is often decided by the shorter border of Connected Component's bounding box). But in image with complex background, the edges of text and that of background touch with each other, which may form Connected Components with size bigger than 60 pixels. So it is needed to deal with this situation. By adjusting the edge threshold in the bounding box of each large Connected Component, some edge pixels with relatively low contrast can be eliminated (These edges shall belong to background objects). The flowchart and an example are illustrated in FIG. 4 and FIG. 5 respectively.

Figure 4:
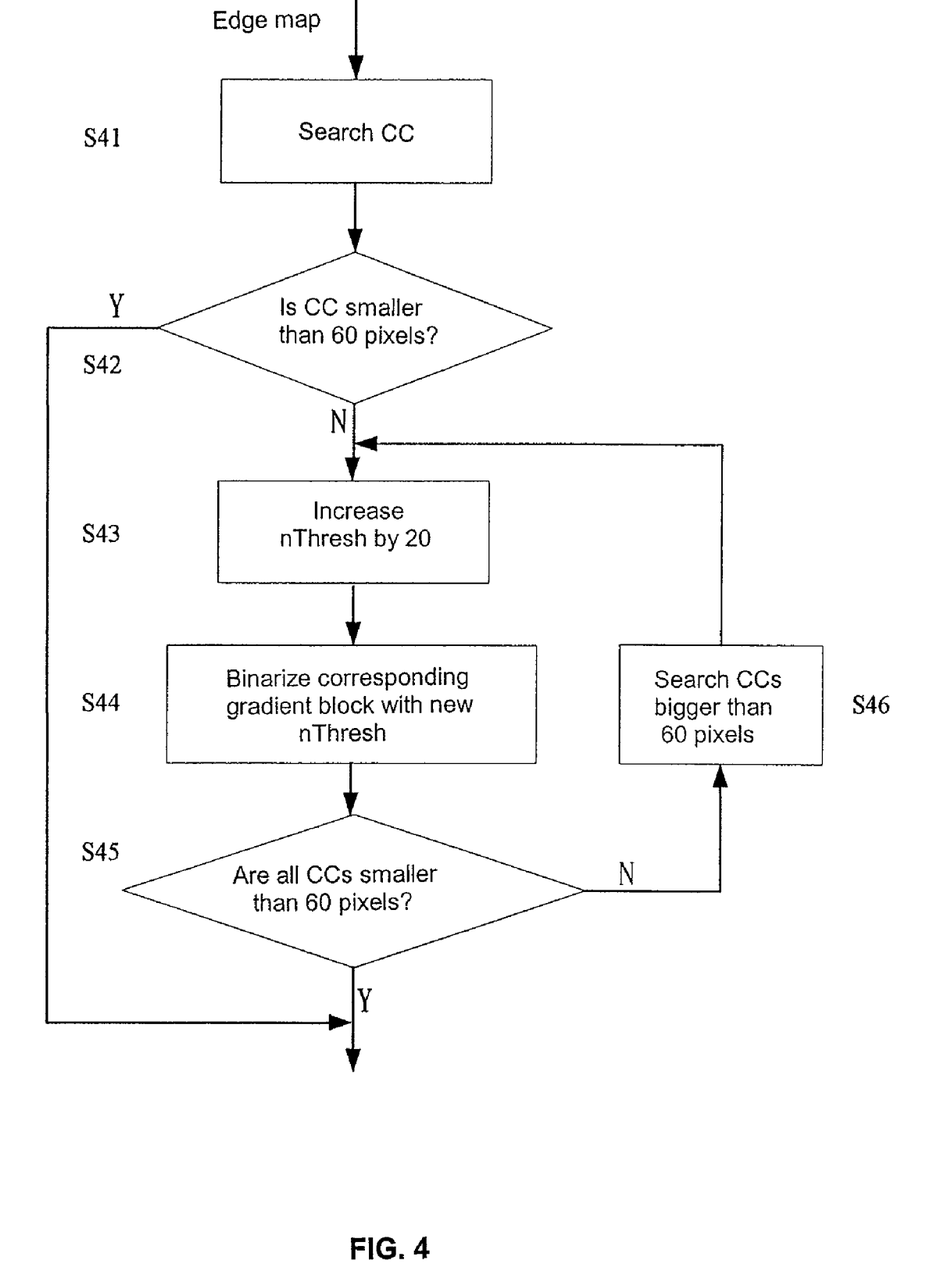
FIG. 4 is a flow chart showing the method of recalculating the local edge map with the feedback of Connected Components size according to the present invention.
Figure 5:
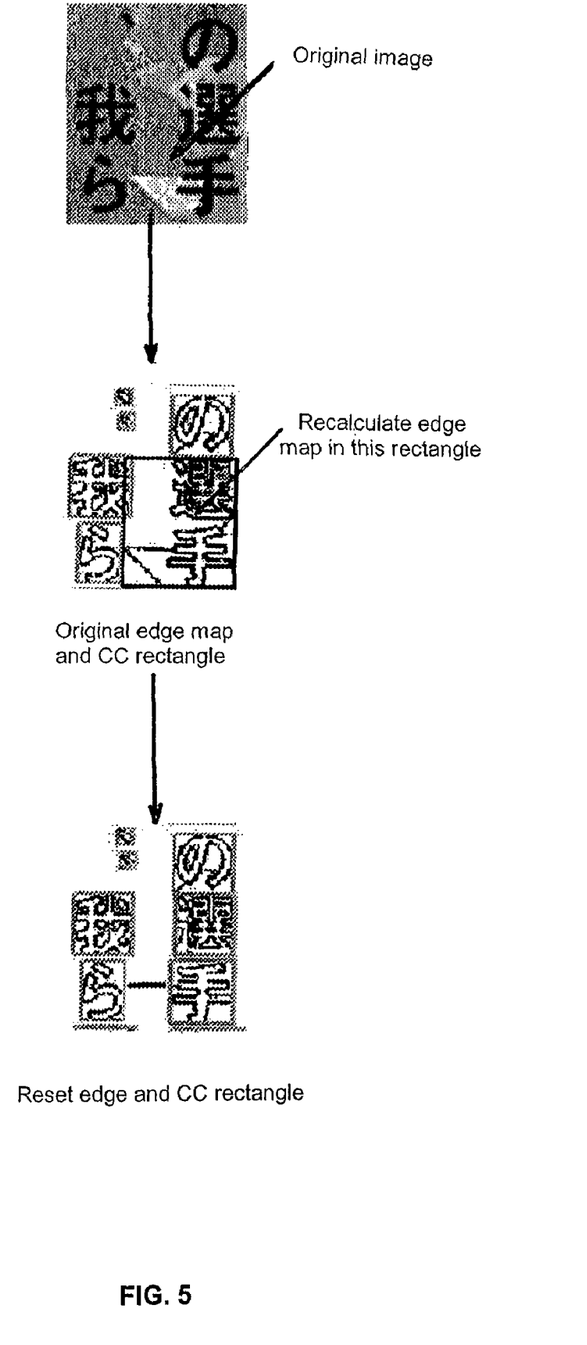
FIG. 5 shows an example and the result of removing the disturbance of the background near the text by recalculating the edge map with the feedback of Connected Components size according to the present invention.

FIG. 4 shows the flow chart of recalculating the local edge map with the feedback of Connected Components size according to the present invention.

At first, the Connected Components formed by edges of both types without distinguishing the negative edge and positive edge are searched again on the input edge map in step S41.

Then, in step S42, the pixel number of the Connected Components is compared with a predetermined threshold, such as 60 pixels, to decide whether the edge map near the Connected Components should be recalculated. If the pixel number of the Connected Components is smaller than 60 pixels, the process is ended and forwards to step 4 of FIG. 2.

On the other hand, if it is decided that the pixel number of the Connected Components is not smaller than the predetermined threshold in step S42, it means that the Connected Components may belong to the background and should be thrown away, and the process is forward to step S43.

In step S43, the threshold value is increased by a predetermined value, such as 20, so as to recalculate the local edge map and remove the disturbance of the complex background.

Then, in step S44, the corresponding gradient block is binarized again with the new threshold and the single characters can be separated from the complex background.

Thereafter, in step S45 it is judged whether the pixel number of all the Connected Components is smaller than 60 pixels. If yes, the process is forward to step 4 of FIG. 2.

Otherwise, if it is not the pixel number of all the Connected Components is smaller than 60 pixels, the process is forward to step S46 to search another Connected Components whose pixel number is larger than 60 pixels. Then, the process is returned to step S46 and goes on to process such Connected Components whose pixel number is larger than 60 pixels.

An example and the result of removing the disturbance of the background near the text by recalculating the edge map with the feedback of Connected Components according to the present invention are shown in FIG. 5. In the example of FIG. 5, the edges of the black rectangle of the bounding boxes of large Connected Components will be recalculated, and the rectangles with light color are the bounding boxes of small Connected Components and do not need to be recalculated their edge maps.

As for the above described step 3, proper thresholding method of the conventional prior art is also a substitute, but it is hard to acquire proper threshold for the whole image. With the feedback of edge Connected Component size, the aim can be focused on the Connected Component covering regions. In these regions, the desired texts can be acquired by using the local information instead of the universal information.

In addition, the backgrounds and texts often have different contrast in local region. Improper edge threshold will result in edge touching. By adjusting the edge threshold and recalculating the edge map according to the above described steps, edge of background objects and that of desired texts can be easily separated. Once separated, it is easier to remove background object by analysis of their edge than thresholding method. What's more, by using the recalculated edge map it is easy to decide that texts are normal or reverse, which will benefit the further text row merging.

After this step, most edge pixels that belong to the background objects are removed, and the ones belong to text are reserved. In this way, the single characters can be easily separated from the background. It will greatly help to locate text accurately.

Now returning back to FIG. 2, after the local edge map is recalculated with the feed back of edge Connected Component size in step 3, the process is forward to step 4.

In step 4, the text map is marked based on the edge Connected Component classification. At this step, edge Connected Components gotten in the previous step are classified into three types of "normal-text", "reverse-text" and "background". Then a mark map is generated, with the foreground pixels of "normal-text" Connected Components are marked as "normal-text", the foreground pixels of "reverse-text" Connected Components are marked as "reverse-text", and the rest pixels are marked as "background".

Thus, there are three types of pixels on the mark map: "normal-text", "reverse-text" and "background". The mark map will help to merge characters with similar properties (namely, "normal-text" or "reverse-text") into text rows, as well as throw away the non-text components. Further more, the mark map will help to better binarize text rows which will be gotten in the next step 5.

Then, in step 5, the text Connected Component is searched and merged to row. On the mark map, Connected Components formed by pixels with the same mark (named text Connected Components) are searched and formed into text rows. There are mainly two reasons for forming texts Connected Components into rows. The first one is that the marked text map cannot be used as the last binary image, because some text may be missing and many noises may exist. By forming text Connected Components into rows, it is easy to find some missing texts and remove some noises. The other reason is that the previous operation of filtering text edge Connected Component is not so sure, because it is difficult to judge whether a Connected Component is a text or not by using only its own features. But for text rows, it is much easier because more effective features for classifying text rows can be found.

There are many text row forming methods in prior arts. The present invention adopts one of these methods with the following steps.

Step 51: Finding Connected Components with same mark in the edge map of the text image.

Step 52: Merging the intersected Connected Components.

Step 53: Throwing away the non-text Connected Components.

Step 54: Forming row seed by using Close Connected Components, and merging the other Connected Components to row.

Step 55: Forming row seed by using far Connected Components, and merging the Connected Components left by step 54 to row.

Step 56: Forming row seed by using the same Connected Components, and merging Connected Components left by step 55 to row.

Step 57: Judging each merged row whether it is a real text row or not.

Figure 6:
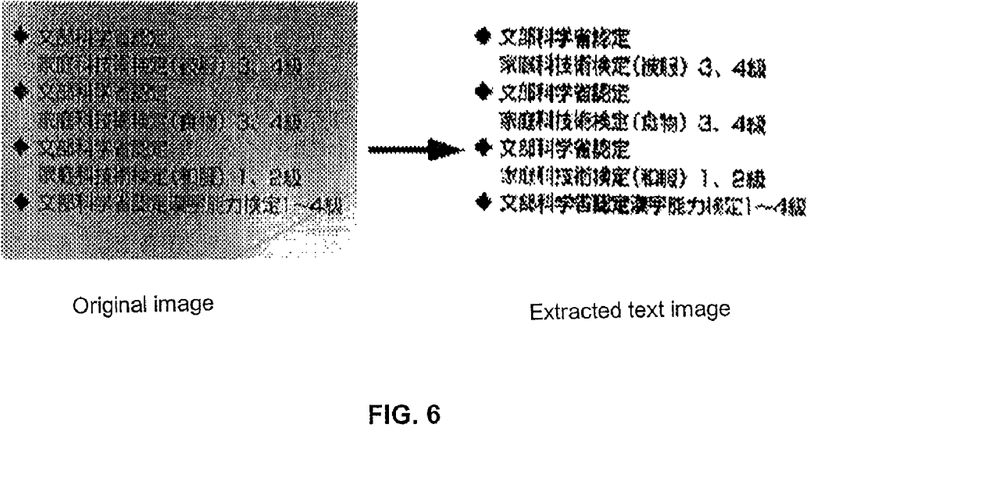
FIG. 6 and FIG. 7 show the results of text extraction by using the method of the present invention.
Figure 7:
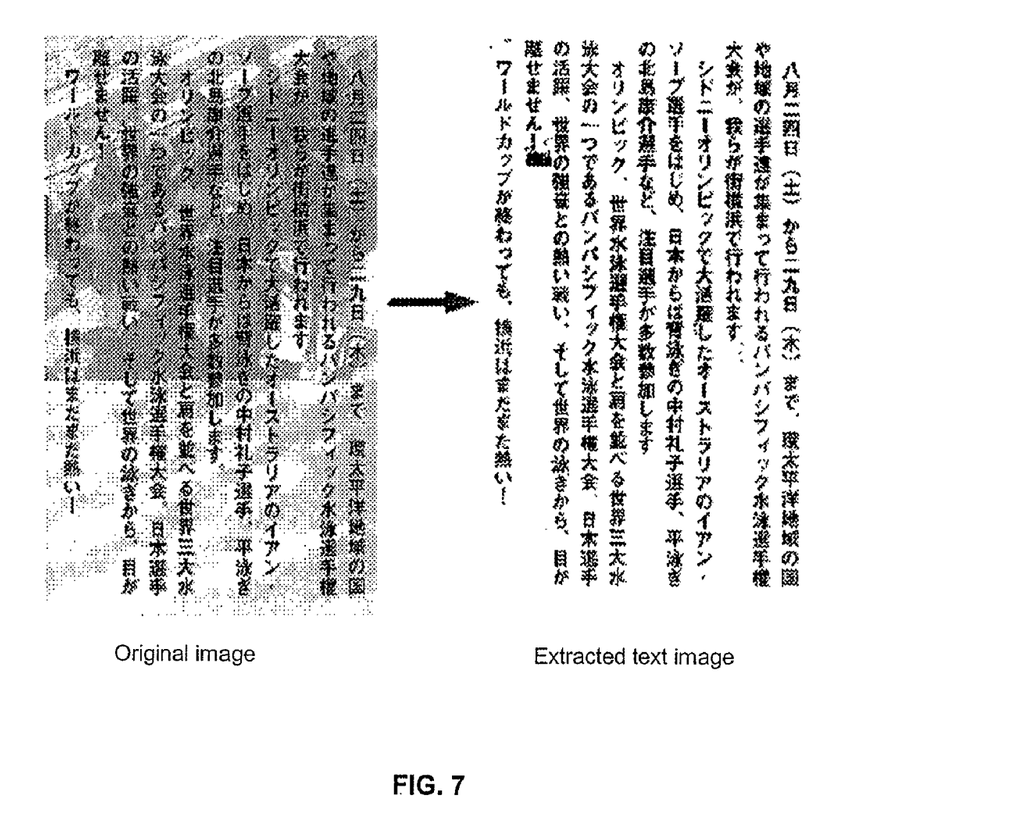

After the above described process, the clear text can be extracted from the image with complex background. FIG. 6 and FIG. 7 give the results of text extraction by using the text extraction method according to the present invention.

The text extraction method according to the present invention is mainly for extracting texts in image with complex background. It can mainly be used in such fields of the preprocessing in OCR (Optical Character Recognition), the text-based video retrieval and the document image compression, etc.

Figure 8:
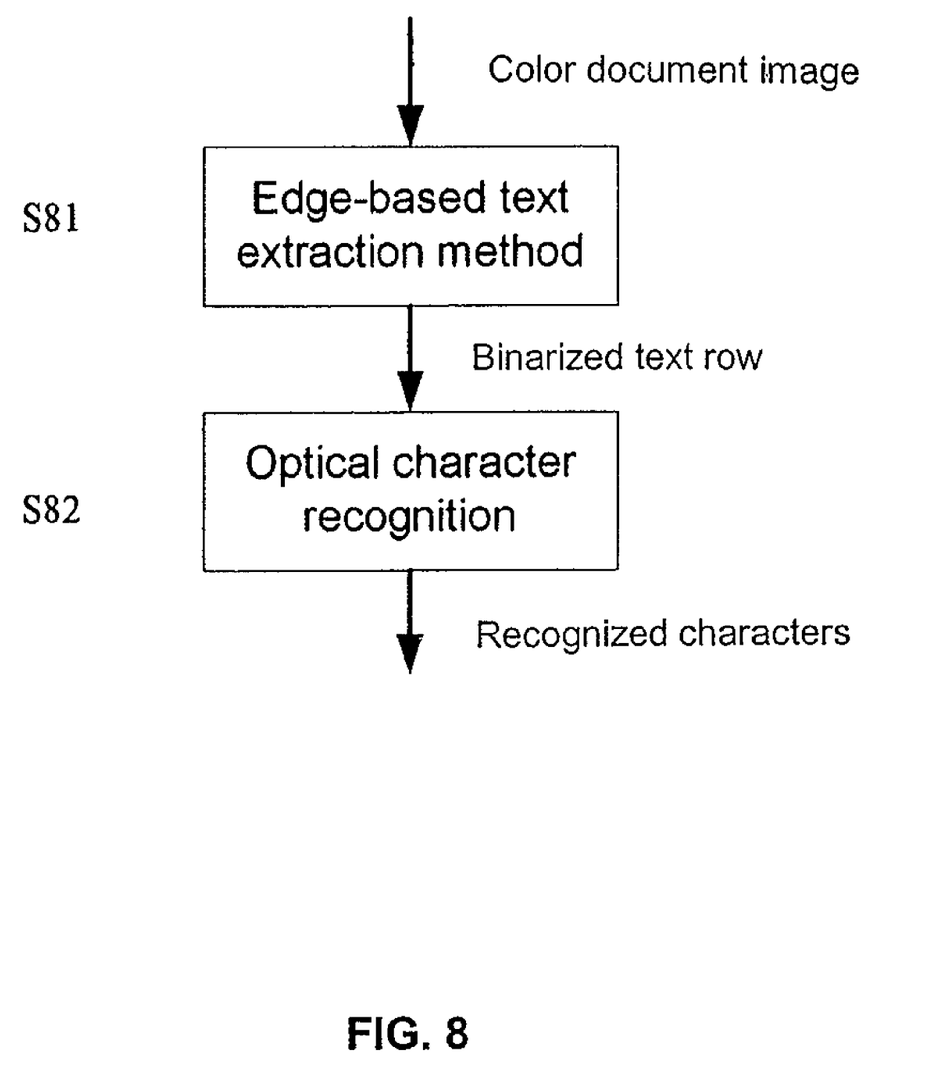
FIG. 8 shows a typical application of the method of extracting text from document image with complex background according to the present invention.

A typical application is shown in FIG. 8, in which the edge based text extraction method according to the present invention is firstly used to process the color document image. Then, the binarized text row is processed with the optical character recognition method and the recognized characters are output.

Figure 9:
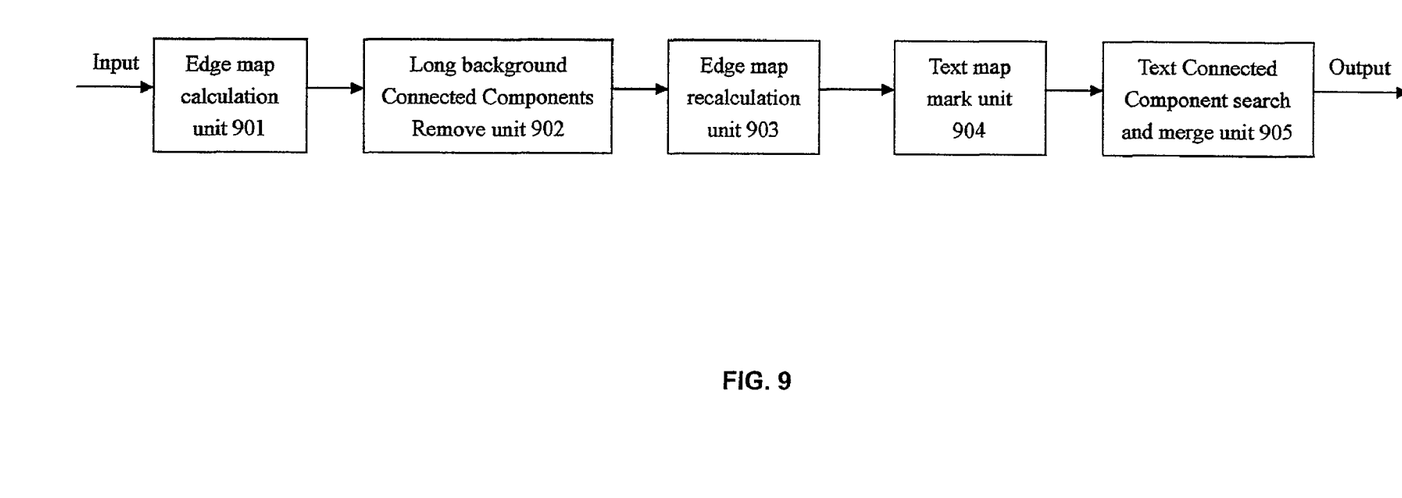
FIG. 9 is a block diagram of the apparatus of extracting text from document image with complex background according to an embodiment of the present invention.

Next, the apparatus of extracting text from document image with complex background according to the present invention will be described by referring to the accompanying drawings. FIG. 9 is a block diagram of the apparatus of extracting text from document image with complex background according to an embodiment of the present invention.

As shown in FIG. 9, the apparatus of extracting text from document image with complex background according to an embodiment of the present invention comprises an edge map calculation unit 901, a long background Connected Components Remove unit 902, an edge map recalculation unit 903, a text map mark unit 904 and a text Connected Component search and merge unit 905.

The edge map calculation unit 901 calculates the edge map of the input document image and output the calculated edge map into the long background Connected Components Remove unit 902.

The long background Connected Components Remove unit 902 classifies the edges in the edge map calculated by the edge map calculation unit 901 into two types of "positive edge" and "negative edge" and searches the Connected Component (CC) formed by edges of the same type. If a Connected Component formed by edges of the same type is long enough, the long background Connected Components Remove unit 902 removes its edges.

The edge map recalculation unit 903 searches Connected Components formed by edges of both types (named edge Connected Component) in the edge map with the long Connected Components formed by edges of the same types being removed by the long background Connected Components Remove unit 902. If the size of a Connected Component formed by edges of both types is too large, the edge map recalculation unit 903 recalculates edge map in its bounding box and searches Connected Components again.

After recalculating the edge map by the edge map recalculation unit 903, the text map mark unit 904 classifies the Connected Components into three types of "normal-text", "reverse-text" and "background", and generates a mark map. In the mark map generated by the text map mark unit 904, the foreground pixels of "normal-text" Connected Components are marked as "normal-text", the foreground pixels of "reverse-text" Connected Components are marked as "reverse-text", and the rest pixels are marked as "background".

The text Connected Component search and merge unit 905 searches on the mark map generated by the text map mark unit 904 the Connected Components formed by pixels with the same mark (named text Connected Component), and forms the Connected Components into text rows.

All the detailed processes performed in the above mentioned edge map calculation unit 901, the long background Connected Components Remove unit 902, the edge map recalculation unit 903, the text map mark unit 904 and the text Connected Component search and merge unit 905 of the apparatus of extracting text from document image with complex background according to the present invention are same as the above steps 1 to 5 described by referring to FIG. 2 respectively and thus are omitted here.

In addition, those skilled in the art should be understand that the apparatus of extracting text from document image with complex background according to an embodiment of the present invention also should comprise an input unit for inputting the document image and an outputting unit for outputting the binarized text row after the text being extracted with the above method and apparatus according to the present invention.

Apparently, those skilled in the art also should be understand that the apparatus of extracting text from document image with complex background according to an embodiment of the present invention can be further implemented as comprising a first edge extracting means for extracting edges which have higher contrast than a first contrast threshold from said image; a searching means for searching connected edges from said extracted edges; a second edge extracting means for extracting edges which have higher contrast than a second contrast threshold in case that the pixels number of said searched connected edges is bigger than a predetermined size, wherein said second contrast threshold is higher than said first contrast threshold.

In a preferred embodiment of the present invention, the second edge extracting means determines that said searched connected edges is a text edge in case that the pixels number of said searched connected edges is smaller than or equal to said predetermined size.

Furthermore, the second edge extracting means also can extracts edges which have higher contrast than the second contrast threshold only from said connected edges in case that the pixels number of said connected edges is bigger than said predetermined size.

In another preferred embodiment of the present invention, the second edge extracting means extracts edges which have higher contrast than the second contrast threshold from the area covering said connected edges in case that the pixels number of said area is bigger than said predetermined size. In such a case, the apparatus of extracting text from document image with complex background further comprises a second connected edge searching means for searching connected edges from said edges extracted in said second edge extracting means; a third edge extracting means for extracting edges which have higher contrast than a third contrast threshold in case that the pixels number of said searched connected edge is bigger than said predetermined size, wherein said third contrast threshold is higher than said second contrast threshold.

The apparatus of extracting text from document image with complex background according to present invention also can comprises an edge classifying means for classifying the edges into two types of "positive edge" and "negative edge" on the basis of the following formula:

$$\text{Edge type} = \begin{cases} \text{negative edge}, & \text{if } |P_o - \max(P_{neighbor})| < \\ & |P_o - \min(P_{neighbor})| \\ \text{positive edge}, & \text{else} \end{cases}$$

where $P_o$ is the gray level of the current edge pixel, $p_{neighbor}$ is the gray level of its N-neighbors; and an edge removing means for removing an area covering the connected area as a background if the pixels number of said area covering the connected edges formed by the same type of edge is longer than a predetermined threshold.

Still in another embodiment of the present invention, the apparatus of extracting text from document image with complex background further comprises a text map marking means for marking out the text from the extracted edges, wherein in the foreground pixels of the area covering the connected edges are marked as "normal-text", the foreground pixels of the area covering the reverse connected edges are marked as "reverse-text", and the rest pixels are marked as "background". The apparatus of extracting text from document image with complex background also comprises a means for searching and forming the text area formed by pixels with the same mark into text rows.

According to another preferred embodiment of the present invention, another apparatus of extracting text from document image with complex background comprises an adjusting means for adjusting the contrast threshold; a text area determining means for determining where is the text area based on said adjusted contrast threshold; wherein said adjusting means comprises a target area determining means for extracting the edges which have higher contrast than said contrast threshold from the target area, searching the connected edges from said extracted edges, and determining whether the area covering said searched connected edges should be a new target area; wherein said adjusting means enlarges said contrast threshold when said determined new target area is bigger than a predetermined size, and finishes adjustment of said contrast threshold when said determined new target area is smaller than or equal to the predetermined size; and wherein the text area determining means determines that the target area corresponding to said contrast threshold whose adjustment is finished should be the text area.

The apparatus of extracting text from document image with complex background according to the above described structure can further comprises an edge classifying means for classifying the edges into two types of "positive edge" and "negative edge" on the basis of the following formula:

$$\text{Edge type} = \begin{cases} \text{negative edge}, & \text{if } |P_o - \max(P_{neighbor})| < \\ & |P_o - \min(P_{neighbor})| \\ \text{positive edge}, & \text{else} \end{cases}$$

where $P_o$ is the gray level of the current edge pixel, $p_{neighbor}$ is the gray level of its N-neighbors; and an edge removing means for removing an area covering the connected area as a background if the pixels number of said area covering the connected edges formed by the same type of edge is longer than a predetermined threshold.

Also the apparatus of extracting text from document image with complex background with the above mentioned structure may further comprises a searching means for searching the area covering the connected edges formed by both types of edges without distinguishing the negative edge and positive edge; a local edge recalculating means for, if the pixels number of the searched area covering the connected edges formed by both types of edges without distinguishing the negative edge and positive edge is larger than a second predetermined threshold, recalculating the local edge of the searched area whose pixels number is larger than the second predetermined threshold; and a second removing means for removing the disturbance of the complex background on the basis of the recalculated local edge.

In one preferred embodiment of the above said apparatus of extracting text from document image with complex background, the local edge recalculating means increases the binarizing threshold a predetermined value and binarizes the gradient block around the searched area whose pixels number is larger than the second predetermined threshold by using the increased binarizing predetermined threshold.

In another embodiment of the present invention, the apparatus of extracting text from document image with complex background further comprises a text map marking means for marking out the text from the extracted edges, wherein in the foreground pixels of the area covering the connected edges are marked as "normal-text", the foreground pixels of the area covering the reverse connected edges are marked as "reverse-text", and the rest pixels are marked as "background". Furthermore, the apparatus of extracting text from document image with complex background also may comprises means for searching and forming the text area formed by pixels with the same mark into text rows.

In addition, the apparatus of extracting text from document image with complex background according to an embodiment of the present invention also can be implemented as comprising means for removing long Connected Component formed by background objects or very close texts in an edge map of the document image based on edge classification; means for recalculating a new edge map of the document image having long Connected Component formed by background objects or very close texts been removed by using feedback of an edge Connected Component size; and means for marking text map based on edge Connected Component classification.

The apparatus of extracting text from document image with complex background according to one preferred embodiment of the present invention further comprises a means for calculating the edge map of the document image by performing Sobel operator on the original image of the document image.

In one embodiment of the present invention, the means for removing long Connected Component classifies the edges in the edge map into two types of "positive edge" and "negative edge" on the basis of the following formula:

$$\text{Edge type} = \begin{cases} \text{negative edge,} & \text{if } |P_o - \max(P_{neighbor})| < \\ & |P_o - \min(P_{neighbor})| \\ \text{positive edge,} & \text{else} \end{cases}$$

where $P_o$ is the gray level of the current edge pixel, $p_{neighbor}$ is the gray level of its N-neighbors; and if any of Connected Components formed by the same type of edge is longer than a predetermined threshold, it is deemed as a background Connected Component and is removed from the edge map.

Preferably, N is equal to 8 and the predetermined threshold is equal to 100.

In another embodiment of the present invention, the means for recalculating the new edge map searches the Connected Components formed by edges of both types without distinguishing the negative edge and positive edge; if the searched Connected Components formed by edges of both types without distinguishing the negative edge and positive edge is larger than a second predetermined threshold, recalculates the local edge map of the searched Connected Components larger than the second predetermined threshold; and removes the disturbance of the complex background on the recalculated local edge map. Preferably, the second predetermined threshold is equal to 60.

According to another preferable embodiment of the present invention, the means for marking text map classifies the edge Connected Components into three types of "normal-text", "reverse-text" and "background", and thus a mark map is generated, wherein the foreground pixels of "normal-text" Connected Components are marked as "normal-text", the foreground pixels of "reverse-text" Connected Components are marked as "reverse-text", and the rest pixels are marked as "background".

The apparatus of extracting text from document image with complex background having the above mentioned structure further comprises a means for searching text Connected Components formed by pixels with the same mark on the mark map and forming the text Connected Components into text rows.

In one preferred apparatus of extracting text from document image with complex background of the present invention, the means for searching and forming the text Connected Components d1) finding Connected Components with same mark in the edge map of the text image; d2) merging the intersected Connected Components; d3) throwing away the non-text Connected Components; d4) forming row seed by using Close Connected Components, and merging the other Connected Components to row; d5) forming row seed by using far Connected Components, and merging the left Connected Components to row; d6) forming row seed by using the same Connected Components, and merging the left Connected Components to row; and d7) judging each merged row whether it is a real text row or not.

Besides the above mentioned concrete embodiments of the present invention's method and apparatus, the objects of the invention may also be realized through running a program or a set of programs on any information processing equipment as described above, which may be communicated with any subsequent processing apparatus. Said information processing equipment and subsequent processing apparatus may be all well-known universal equipments.

Therefore, it is important to note that the present invention includes a case wherein the invention is achieved by directly or remotely supplying a program (a program corresponding to the illustrated flow chart in the embodiment) of software that implements the functions of the aforementioned embodiments to a system or apparatus, and reading out and executing the supplied program code by a computer of that system or apparatus. In such case, the form is not limited to a program as long as the program function can be provided.

Therefore, the program code itself installed in a computer to implement the functional process of the present invention using computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy disk, hard disk, optical disk, magneto optical disk, MO, CD-ROM, CD-R, CD-RW, magnetic tape, non-volatile memory card, ROM, DVD (DVD-ROM, DVD-R), and the like may be used.

As another program supply method, connection may be established to a given home page on the Internet using a browser on a client computer, and the computer program itself of the present invention or a file, which is compressed and includes an automatic installation function, may be downloaded from that home page to a recording medium such as a hard disk or the like, thus supplying the program. Also, program codes that form the program of the present invention may be broken up into a plurality of files, and these files may be downloaded from different home pages. That is, the present invention also includes a WNW server that makes a plurality of users download program files for implementing the functional process of the present invention using a computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

What has been describes herein is merely illustrative of the application of the principles of the present invention. For example, the functions described above as implemented as the best mode for operating the present invention are for illustration purposes only. As a particular example, for instance, other design may be used for obtaining and analyzing waveform data to determine speech. Also, the present invention may be used for other purposes besides detecting speech. Accordingly, other arrangements and methods may be implemented by those skilled in the art without departing from the scope and spirit of this invention.

What is claimed is:

1. A method of extracting text from a document image with a complex background, comprising the steps of:

a first edge extracting step of extracting edges from said image which have higher contrast than a first contrast threshold;

a searching step of searching for connected edges from said extracted edges;

a second edge extracting step of extracting connected edges which have higher contrast than a second contrast threshold and which have a number of pixels larger than a predetermined size, wherein said second contrast threshold is higher than said first contrast threshold, and of determining that connected edges are a text edge in case that the number of pixels of the connected edges is smaller than or equal to said predetermined size;

a second connected edge searching step of searching for connected edges from edges extracted in said second edge extracting step;

a third edge extracting step of extracting connected edges from the connected edges searched for in the second connected edge searching step which have higher contrast than a third contrast threshold and which have a number of pixels larger than said predetermined size, wherein said third contrast threshold is higher than said second contrast threshold.

2. A method of extracting text from a document image with a complex background, comprising the steps of:

a first edge extracting step of extracting edges from said image which have higher contrast than a first contrast threshold;

a searching step of searching for connected edges from said extracted edges;

a second edge extracting step of extracting connected edges which have higher contrast than a second contrast threshold and which have a number of pixels larger than a predetermined size, wherein said second contrast threshold is higher than said first contrast threshold;

an edge classifying step of classifying the edges into one of two types of "positive edge" and "negative edge" on the basis of the following formula:

$$\text{Edge type} = \begin{cases} \text{negative edge}, & \text{if } |P_o - \max(P_{neighbor})| < |P_o - \min(P_{neighbor})| \\ \text{positive edge}, & \text{else} \end{cases}$$

where $P_o$ is the gray level of the current edge pixel, $P_{neighbor}$ is the gray level of its N-neighbors; and an edge removing step of removing an area covering connected edges formed by the same type of edge as a background if the number of pixels of said area covering the connected edges formed by the same type of edge is larger than a predetermined threshold.

3. A method of extracting text from a document image with a complex background, comprising the steps of:

a first edge extracting step of extracting edges from said image which have higher contrast than a first contrast threshold;

a searching step of searching for connected edges from said extracted edges;

a second edge extracting step of extracting connected edges which have higher contrast than a second contrast threshold and which have a number of pixels larger than a predetermined size, wherein said second contrast threshold is higher than said first contrast threshold;

a text map marking step of marking out text from the extracted connected edges, wherein foreground pixels of an area covering the extracted connected edges are marked as "normal-text", foreground pixels of the area covering reverse extracted connected edges are marked as "reverse-text", and the rest of the pixels are marked as "background"; and searching and forming a text area formed by pixels with the same mark into text rows.

4. A method of extracting text from a document image with a complex background, comprising the steps of:

an adjusting step of adjusting a contrast threshold;

a text area determining step of determining where a text area is based on said adjusted contrast threshold, wherein said adjusting step comprises a target area determining step of extracting edges which have higher contrast than said contrast threshold from a target area, searching for connected edges from said extracted edges, and determining whether an area covering said searched-for connected edges should be a new target area, wherein said adjusting step enlarges said contrast threshold when said new target area is determined and is larger than a predetermined size, and finishes adjustment of said contrast threshold when said new target area is smaller than or equal to the predetermined size, and wherein the text area determining step determines that the new target area corresponding to said contrast threshold whose adjustment is finished should be the text area;

an edge classifying step of classifying the edges into one of two types of "positive edge" and "negative edge" on the basis of the following formula:

$$\text{Edge type} = \begin{cases} \text{negative edge}, & \text{if } |P_o - \max(P_{neighbor})| < |P_o - \min(P_{neighbor})| \\ \text{positive edge}, & \text{else} \end{cases}$$

where $P_o$ is the gray level of the current edge pixel, $P_{neighbor}$ is the gray level of its N-neighbors; and an edge removing step of removing an area covering connected edges formed by the same type of edge as a background if the number of pixels of said area covering the connected edges formed by the same type of edge is larger than a predetermined threshold.

5. The method according to claim 4, further comprising the steps of:

searching an area covering connected edges formed by both types of edges without distinguishing between the negative edge and positive edge;

recalculating, if the number of pixels of the searched area covering the connected edges formed by both types of edges is larger than a second predetermined threshold, a local edge of the searched area covering the connected edges formed by both types of edges; and removing a disturbance of the complex background on the basis of the recalculated local edge.

6. The method according to claim 5, wherein the step of recalculating the local edge comprising the steps of:

increasing a binarizing threshold a predetermined value; and binarizing a gradient block around the searched area whose pixels number is larger than the second predetermined threshold by using the increased binarizing threshold.

7. A method of extracting text from a document image with a complex background, comprising the steps of:

an adjusting step of adjusting a contrast threshold;

a text area determining step of determining where a text area is based on said adjusted contrast threshold, wherein said adjusting step comprises a target area determining step of extracting edges which have higher contrast than said contrast threshold from a target area, searching for connected edges from said extracted edges, and determining whether an area covering said searched-for connected edges should be a new target area, wherein said adjusting step enlarges said contrast threshold when said new target area is determined and is larger than a predetermined size, and finishes adjustment of said contrast threshold when said new target area is smaller than or equal to the predetermined size; and wherein the text area determining step determines that the new target area corresponding to said contrast threshold whose adjustment is finished should be the text area;

a text map marking step of marking out text from the extracted connected edges, wherein foreground pixels of an area covering the extracted connected edges are marked as "normal-text", foreground pixels of the area covering reverse extracted connected edges are marked as "reverse-text", and the rest of the pixels are marked as "background"; and searching and forming a text area formed by pixels with the same mark into text rows.

8. An apparatus for extracting text from a document image with a complex background, comprising:

a first edge extracting means for extracting edges from said image which have higher contrast than a first contrast threshold;

a searching means for searching for connected edges from said extracted edges;

a second edge extracting means for extracting connected edges which have higher contrast than a second contrast threshold and which have a number of pixels larger than a predetermined size, wherein said second contrast threshold is higher than said first contrast threshold, and of determining that connected edges are a text edge in case that the number of pixels of the connected edges is smaller than or equal to said predetermined size;

a second connected edge searching means for searching for connected edges from edges extracted by said second edge extracting means; and a third edge extracting means for extracting connected edges from the connected edges searched for by the second connected edge searching means which have higher contrast than a third contrast threshold and which have a number of pixels larger than said predetermined size, wherein said third contrast threshold is higher than said second contrast threshold.

9. An apparatus for extracting text from a document image with a complex background, comprising:

a first edge extracting means for extracting edges from said image which have higher contrast than a first contrast threshold;

a searching means for searching for connected edges from said extracted edges;

a second edge extracting means for extracting connected edges which have higher contrast than a second contrast threshold and which have a number of pixels larger than a predetermined size, wherein said second contrast threshold is higher than said first contrast threshold;

an edge classifying means for classifying the edges into one of two types of "positive edge" and "negative edge" on the basis of the following formula:

$$\text{Edge type} = \begin{cases} \text{negative edge}, & \text{if } |P_o - \max(P_{neighbor})| < |P_o - \min(P_{neighbor})| \\ \text{positive edge}, & \text{else} \end{cases}$$

where $P_o$ is the gray level of the current edge pixel, $P_{neighbor}$ is the gray level of its N-neighbors;

and an edge removing means for removing an area covering connected edges formed by the same type of edge as a background if the number of pixels of said area covering the connected edges formed by the same type of edge is larger than a predetermined threshold.

10. An apparatus for extracting text from a document image with a complex background, comprising:

a first edge extracting means for extracting edges from said image which have higher contrast than a first contrast threshold;

a searching means for searching for connected edges from said extracted edges;

a second edge extracting means for extracting connected edges which have higher contrast than a second contrast threshold and which have a number of pixels larger than a predetermined size, wherein said second contrast threshold is higher than said first contrast threshold;

a text map marking means for marking out text from the extracted connected edges, wherein foreground pixels of an area covering the extracted connected edges are marked as "normal-text", foreground pixels of the area covering reverse extracted connected edges are marked as "reverse-text", and the rest of the pixels are marked as "background"; and a means for searching and forming a text area formed by pixels with the same mark into text rows.

11. An apparatus for extracting text from a document image with a complex background, comprising:

an adjusting means for adjusting a contrast threshold;

a text area determining means for determining where a text area is based on said adjusted contrast threshold, wherein said adjusting means comprises a target area determining means for extracting edges which have higher contrast than said contrast threshold from a target area, searching for connected edges from said extracted edges, and determining whether an area covering said searched-for connected edges should be a new target area, wherein said adjusting means enlarges said contrast threshold when said new target area is determined and is larger than a predetermined size, and finishes adjustment of said contrast threshold when said new target area is smaller than or equal to the predetermined size, and wherein the text area determining means determines that the new target area corresponding to said contrast threshold whose adjustment is finished should be the text area;

an edge classifying means for classifying the edges into one of two types of "positive edge" and "negative edge" on the basis of the following formula:

$$\text{Edge type} = \begin{cases} \text{negative edge}, & \text{if } |P_o - \max(P_{neighbor})| < |P_o - \min(P_{neighbor})| \\ \text{positive edge}, & \text{else} \end{cases}$$

where $P_o$ is the gray level of the current edge pixel, $P_{neighbor}$ is the gray level of its N-neighbors; and an edge removing means for removing an area covering connected edges formed by the same type of edge as a background if the number of pixels of said area covering the connected edges formed by the same type of edge is larger than a predetermined threshold.

12. The apparatus according to claim 11, further comprising:

a searching means for searching an area covering connected edges formed by both types of edges without distinguishing between the negative edge and positive edge;

a local edge recalculating means for recalculating, if the number of pixels of the searched area covering the connected edges formed by both types of edges is larger than a second predetermined threshold, a local edge of the searched area covering the connected edges formed by both types of edges; and a second removing means for removing a disturbance of the complex background on the basis of the recalculated local edge.

13. The apparatus according to claim 12, wherein the local edge recalculating means increases a binarizing threshold a predetermined value, and binarizes a gradient block around the searched area whose pixels number is larger than the second predetermined threshold by using the increased binarizing threshold.

14. An apparatus for extracting text from a document image with a complex background, comprising:

an adjusting means for adjusting a contrast threshold;

a text area determining means for determining where a text area is based on said adjusted contrast threshold, wherein said adjusting means comprises a target area determining means for extracting edges which have higher contrast than said contrast threshold from a target area, searching for connected edges from said extracted edges, and determining whether an area covering said searched-for connected edges should be a new target area, wherein said adjusting means enlarges said contrast threshold when said new target area is determined and is larger than a predetermined size, and finishes adjustment of said contrast threshold when said new target area is smaller than or equal to the predetermined size; and wherein the text area determining means determines that the new target area corresponding to said contrast threshold whose adjustment is finished should be the text area;

a text map marking means for marking out text from the extracted connected edges, wherein foreground pixels of an area covering the extracted connected edges are marked as "normal-text", foreground pixels of the area covering reverse extracted connected edges are marked as "reverse-text", and the rest of the pixels are marked as "background"; and means for searching and forming a text area formed by pixels with the same mark into text rows.

15. An apparatus for extracting text from a document image with a complex background, comprising:

an edge map calculation unit for calculating an edge map of the document image;

a long background connected edges remove unit for classifying edges in the edge map calculated by the edge map calculation unit into one of two types of "positive edge" and "negative edge", searching for connected edges formed by edges of the same type, and removing the connected edges formed by edges of the same type longer than a predetermined threshold;

an edge map recalculation unit for searching for connected edges formed by edges of both types in the edge map with the long connected edges formed by edges of the same types removed by the long background connected edges remove unit, and recalculating a local edge map for a bounding box of a connected edge formed by edges of both types larger than a second predetermined threshold;

a text map mark unit for classifying the connected edges into three types of "normal-text", "reverse-text" and "background" and generating a mark map, wherein foreground pixels of "normal-text" connected edges are marked as "normal-text", foreground pixels of "reverse-text" connected edges are marked as "reverse-text", and the rest of the pixels are marked as "background"; and a text connected edge search and merge unit for searching on the mark map generated by the text map mark unit for the connected edges formed by pixels with the same mark and forming the connected edges into text rows.

16. The apparatus according to claim 15, further comprising:

an input unit for inputting the document image; and an outputting unit for outputting a binarized text row after the text is extracted.

\* \* \* \* \*